United States Patent [19]

Hrovat et al.

[11] 4,271,101

[45] Jun. 2, 1981

[54] PROCESS FOR THE PRODUCTION OF SPHERICAL-SHAPED FUEL ELEMENTS FOR HIGH TEMPERATURE REACTORS

[75] Inventors: Milan Hrovat, Rodenbach; Gerhard Spener, Hanau, both of Fed. Rep. of Germany

[73] Assignee: HOBEG Hochtemperaturreaktor-Brennelement GmbH, Hanau, Fed. Rep. of Germany

[21] Appl. No.: 75,186

[22] Filed: Sep. 13, 1979

Related U.S. Application Data

[63] Continuation of Ser. No. 855,452, Nov. 28, 1977, abandoned.

[30] Foreign Application Priority Data

Dec. 2, 1976 [DE] Fed. Rep. of Germany ....... 2654536

[51] Int. Cl.$^3$ .............................................. G21C 21/00
[52] U.S. Cl. .............................................. 264/0.5
[58] Field of Search ........................................ 264/0.5

[56] References Cited

U.S. PATENT DOCUMENTS

| 3,912,798 | 10/1975 | Rachor et al. | 264/0.5 |
| 3,975,471 | 8/1976 | Hrovat et al. | 264/0.5 |
| 4,017,567 | 4/1977 | Hrovat et al. | 264/0.5 |

FOREIGN PATENT DOCUMENTS 1096513   1/1961   Fed. Rep. of Germany .

*Primary Examiner*—Leland A. Sebastian

*Attorney, Agent, or Firm*—Cushman, Darby & Cushman

[57] ABSTRACT

Nearly isotropic spherical fuel elements of high strength and high heavy metal content for gas cooled high temperature reactors consisting of a fissile and fertile fuel material containing nucleus and a fuel free shell are prepared by preliminarily compressing a molding powder consisting of a mixture of natural graphite and binder resin, synthetic graphite and binder resin or a mixture of both types of graphite powder and binder resin together with coated fissile and/or fertile fuel material particles with addition of a lubricant in a rubber mold with an ellipsoidally shaped cavity at low molding pressure three dimensionally to preform the nucleus of the fuel element, shaping the preformed nucleus into the required molding powder for the shell in a second rubber mold with ellipsoidally shaped cavity, preliminarily compressing this fuel element compact and subsequently final pressing and heat treating at up to about 2000° C., the shaped fuel element in the rubber mold at a pressure of less than 200 kg/cm$^2$ being precompressed three dimensionally to such an extent that the green graphite matrix of the so formed ellipsoidal compact has a density value of more than 65% of the theoretical green density and subsequently final pressing in a single dimension the preliminarily compressed fuel element body in a steel die between two cup shaped metal dies in the plastic temperature range of the binder resin at a pressure of less than 200 kp/cm$^2$ to densities of more than 95% of the theoretical density of the green graphite matrix.

6 Claims, No Drawings

PROCESS FOR THE PRODUCTION OF SPHERICAL-SHAPED FUEL ELEMENTS FOR HIGH TEMPERATURE REACTORS

This is a continuation of application Ser. No. 855,452 filed Nov. 28, 1977, now abandoned.

BACKGROUND OF THE INVENTION

The invention is directed to a process for the production of nearly isotropic spherically shaped fuel elements having increased requirements, particularly high heavy metal content for improved gas cooled high temperature reactors by pressing a molding powder consisting of a mixture of natural graphite and binder resin, synthetic graphite and binder resin or a mixture of both types of graphite powder and binder resin together with coated fissile and fertile fuel material particles.

Spherical fuel elements customarily consist of a fissile and fertile fuel material containing nucleus which is surrounded by a fuel free shell and is joined to it without transition (Hrovat, German OS No. 1,646,783).

The graphite matrix, i.e., the graphite material, is identical in the nucleus of the sphere and in the fuel free shell. The fuel element diameter in general is 40 to 80 mm, by preference about 60 mm and the thickness of the shell is 2 to 20 mm, by preference about 5 mm.

In the known spherical fuel elements the nucleus contains in homogeneous distribution the fissile and fertile fuel materials in the form of spherical heavy metal particles. To retain fission products the particles are provided with multiple coatings of pyrolytic carbon, in a given case with an intermediate layer of silicon carbide.

As fissile fuel material there is normally employed uranium 235 and as fertile material thorium 232, the fissile and fertile fuel material being employed as the carbide or oxide. While the fissile and fertile fuel materials in the so-called THTR element, the standard spherical element of the thorium high temperature reactor, are jointly present in the same particles, they are provided for in the so-called Feed-Breed-Element separated in discrete particles mixed with each other.

A series of requirements is placed on the spherical fuel elements:

They must have high strength properties with the least possible modulus of elasticity and small thermal coefficients of expansion. During the reactor operation, particularly at start up and shut down of the reactor proceed as a result of temperature gradients thermal stresses which can only be partially relaxed by creep processes and therefore produce heavy mechanical stresses in the fuel element spheres. Since in the charging of the reactor core and circulation of the sphere heap the fuel elements drop from several meters high to the sphere heap surface, there are high additional mechanical stresses. Additionally in the disconnecting of the reactor operation the absorber rods get into the sphere heap directly which leads to a further considerable load on the individual fuel elements. In order to guarantee a sufficiently high service life of the fuel elements there are required high values for compressive, bending and tensile strength of the fuel element matrix. For the previously mentioned reasons there are added the requirements of a good drop and abrasion resistance and particularly of a high crushing load of the spheres.

Besides they must have a high heat conductivity in order to hold the temperature gradients inside the sphere as small as possible.

Furthermore, a good corrosion resistance against trace impurities is necessary, as for example against water vapor, CO, $CO_2$ and $H_2$ which are contained in the helium cooling gas.

Besides there is an increased heavy metal content of the spherical fuel elements. In the so-called THTR-Standard-Fuel-Element the heavy metal content is 11 grams per sphere. To raise the conversion rate (formation of uranium 233 from thorium 232) a substantially higher heavy metal content of the fuel elements for advanced high temperature reactors is required. Thereby in spite of the increased heavy metal content in the production the requirements of extremely low fractions of defective coated particles in the molded spherical fuel element are intensified.

Besides a good irradiation behavior is necessary up to temperatures of about 1400° C. and up to an exposure to fast neutrons (E>0.1 MeV) of about $9 \times 10^{21}$ neutrons/cm$^{-2}$. This requirement assumes an as much as possible high crystallinity of the isotropic graphite matrix.

For the production of spherical fuel element previously, processes have been proposed in which first the lower half of the fuel free shell is formed in a metallic pressing die, then the fuel containing spherical nucleus inserted and subsequently the upper shell half pressed on (German Patent No. 1,096,513). Since the bulk density of the molding powder mixture is relatively small (about 0.5 g/m$^3$) and merely is densified in the axial direction about four times the volume, in the pressing there cannot be avoided a preferred orientation of the customarily anisotropic constructed graphite starting particles. This has as a result an inadmissible anisotropy of the matrix of the sphere. In such a sphere there occur in the irradiation with fast neutrons high irradiation induced stresses which can lead to the formation of cracks and therewith endanger the mechanical integrity of the fuel element.

This disadvantage is avoided if in place of the die molding process with a steel tool there is used the semi-isostatic pressing in rubber molds of silicone rubber (Hrovat, German OS No. 1,646,783). The silicone rubber behaves in the pressing under pressure similarly to a liquid. Thereby there is attained an isotropic three-dimensional compressing of the molding powder. To take up the molding powder the rubber mold formed of two halves has a central, elliptic shaped cavity which is so proportioned that in the pressing there is formed a sphere having a diameter for example of about 60 mm. The prepared filled rubber mold is introduced into a steel die of the press and pressed together with the upper and lower punches. Because of the elastic behavior of the rubber there is used molding at room temperature and consequently a very high molding pressure is required. The fuel element spheres having a diameter of 60 mm are customarily compressed with a molding pressure of 3 metric tons/cm$^2$ which at the required rubber mold size corresponds to a very high pressing force of 400 tons (i.e., 400 metric tons). Therewith so that at this high molding pressure no particles bordering each other are mutually damaged the particles are encased in molding powder. In order that the spheres produced from the encased particles maintain a sufficient strength according to Hrovat German Patent No. 1,909,871 only a part of the molding powder needed for the nucleus is used to encase the particles, the remaining part mixed with the encased particles and the mixture pressed to the nucleus. In this way there are produced fuel element spheres with isotropic properties with a limit of up to about 11 grams heavy metal content. At higher heavy metal contents of for example 20 to 30 grams per sphere, however, there cannot be avoided the destruction of a part of the coated particles in the pressing.

In German OS No. 2,246,163 (and related Rachor U.S. Pat. No. 3,912,798) to improve the course of the process there is proposed that the second pressing step in which the spherical nucleus embedded in a coating of graphite molding powder is pressed in a rubber mold is divided into two pressing stages wherein first there is carried out a preliminary pressing in a rubber mold at low pressure and then this preformed object is final pressed at high pressure. Here also at high metal content there cannot be avoided particle damage due to the high molding pressure.

Furthermore, there has been proposed a process according to which there is first produced from the binder resin containing graphite molding powder mixture a granulate having isometrically constructed particles of high bulk density and then hot pressing this granulate together with the coated fuel particles in the plastic range of the binder resin at the relatively very low pressure of 100-200 kp/cm$^2$ to molded articles (German Patent No. 2,104,431 and related Hrovat U.S. Pat. No. 4,017,567). Indeed with this process there can be prepared prismatic molded articles with an extensive isotropic structure and high heavy metal content on which there is placed no requirements as to the drop strength and crushing load but no spherical fuel elements can be considered for the above mentioned requirements. The decisive reason for this is a relatively poor bond of the smooth surfaces of the individual granulate particles which are already precompressed. Therefore, this process is unsuited for the production of fuel element spheres with the required drop strength and crushing load.

The entire disclosures of the aforementioned German OS No. 1,646,783, German Patent No. 1,096,513, German Patent No. 1,909,871, U.S. Pat. No. 3,912,798 and U.S. Pat. No. 4,017,567 are hereby incorporated by reference and relied upon.

SUMMARY OF THE INVENTION

The present invention therefore is based on the problem of working up a new process which avoids the above-mentioned disadvantages and permits the production of fuel element spheres having high heavy metal contents, e.g., 20-40 grams per sphere which are isotropic and have good mechanical strength properties, particularly high crushing loads and high drop strength and consist of a fuel and fertile material containing nucleus and a fuel free shell. Fuel element spheres with heavy metal contents in the usual range of about 5 to about 15 grams heavy metal per sphere can be produced too.

In the invention as fissile material there can be used, for example, oxides or carbides of U 235, U 233 and fissionable plutonium isotopes. As fertile fuel materials there can be used, for example, oxides and carbides of U 238 or Th 232. As binder resins there can be used, for example, phenol-formaldehyde resin, xylenol-formaldehyde resin, cresol-formaldehyde resin or furfuryl alcohol resin.

The problem was solved by preliminarily compressing a molding powder consisting of a mixture of natural graphite and/or synthetic graphite with a binder resin, together with coated fissile and/or fertile fuel material particles with addition of a lubricant in a rubber mold having an ellipsoidal cavity at low molding pressure three-dimensionally to preform the nucleus of the fuel element, shaping the nucleus into the required molding powder for the shell in a second rubber mold with ellipsoidal cavity, preliminarily compressing this fuel element and subsequently final pressing and heat treating at up to about 2000° C., the improvement of the invention including precompressing the shaped fuel element in the rubber mold with ellipsoidal cavity at a pressure of less than 200 kp/cm$^2$ three dimensionally to such an extent that the green graphite matrix of the so formed ellipsoidal compact has a value of more than 65% of the theoretical green density and subsequently final pressing the preliminarily compressed fuel element in a steel die between two cup shaped metal punches in the plastic temperature range of the binder resin at a forming pressure of less than 200 kp/cm$^2$ to densities of more than 95% of the theoretical density of the green graphite matrix.

The most important advantages of the pressing technique of the invention are a lower forming pressure which permits a compacting of embedded coated fuel particles without particle breakage even at high heavy metal content in the fuel element, a good joining of the individual graphite starting particles to form the fuel element matrix with a high breaking load and good drop strength and an isotropic compressing. This is produced because the substantial reduction in volume of the molding mixture already takes place three dimensionally in the rubber molds so that in the subsequent one dimensional final pressing in the steel die there is avoided an inadmissible preferential orientation of the primary graphite particles.

There have proven suitable as pressure ranges for the preliminary compressing of the fuel element values of 50-190 kp/cm$^2$ through which there are produced densities of 65-85% of the theoretical density and for the final molding pressures of 100-190 kp/cm$^2$ through which densities from 95% up to nearly 100% are attained. In the preliminary compressing there are advantageously used temperature of 20° to 85° C., in the final molding temperatures of 100°-200° C.

To reduce the internal friction in the final molding and to cause an intensive lubrication of the matrices there is advantageously added a lubricant to the molding composition. It is known in the production of fuel elements to use, for example, stearic acid with a melting point of 69.2° C. as the lubricant. However, there can also be used other lubricants, the particular lubricant used not being critical.

Furthermore, pressing experiments show that rubber molds produced from silicon rubber form absolutely elastically up to about 80° C. and endure several thousand molding operations without wear. Therefore, it is particularly advantageous according to the invention to carry out the semi-isostatic pressing not at room temperature but at slightly elevated temperature at which the low melting lubricant begins to become fluid. This procedure has the advantage that already in the three dimensional presses in rubber molds there is produced a still stronger compression of the graphite matrix. The density values reached thereby correspond to up to 85% of the theoretical density.

The process can comprise, consist essentially of or consist of the steps set forth and the compositions can comprise, consist essentially of or consist of the materials set forth.

Unless otherwise indicated all parts and percentages are by weight and all measures are metric tons.

The process of the invention will be further explained in connection with the following examples.

DESCRIPTION OF THE PREFERRED EMBODIMENTS

EXAMPLE 1

Production of a Spherical Fuel Element Having 30 Grams of Heavy Metal

As fissile fuel particles there served spherical kernels of $UC_2$ having a diameter of 200 μm. These particles were provided with a triple coating, namely, with pyrolytically deposited carbon layers and an intermediate layer of silicon carbide. The total thickness of the coating was 205 μm. The coated particles having an average diameter of 610 μm and a density of 2.17 g/cm³ contained 17 weight % uranium.

The fertile material particles $(ThO)_2$ having a kernel diameter of 500 μm were twice provided with pyrolytically deposited carbon layers having a total thickness of 170 μm. The coated particles with an average diameter of 840 μm and a density of 3.39 g/cm³ contained 54.3 weight % of thorium.

As the graphite molding powder there was used a mixture consisting of 63.2 weight % natural graphite, 15.9 weight % graphitized petroleum coke, 19.9% phenolformaldehyde resin as a binder and 1% stearic acid as a lubricant.

If there is inserted for the graphite powder components the density of the graphite single crystal of 2.26 g/cm², for the phenol-formaldehyde the ascertained density of 1.31 g/cm³ and for the stearic acid a density of 0.839 g/cm³ the theoretical density of the green graphite matrix is 1.93 g/cm³.

Next, the fissile and fertile fuel material particles were encased with the graphite molding powder in separate processes in a revolving drum with addition of methanol. The amount of powder was uniformly so selected that there resulted an average over coating layer thickness of 130 μm.

For a fuel element nucleus the pressing charge is composed of 96 grams of encased coated fertile material particles, 13 grams of encased coated fissile fuel particles and 37 grams of graphite molding powder.

The rubber mold used to preform the fuel element nucleus has an ellipsoidal cavity of 130 cm³ volume with an ellipsoid diameter of 57 mm and height of 79 mm. The rubber mold was filled with the homogeneous mixture of these components and was introduced into the steel die of the mold and pressed together with the upper and lower punches at room temperature under a pressure of 70 kp/cm². Thereby the graphite molding powder was compressed three dimensionally isotropically from 0.5 g/cm³ to a matrix density of 1.3 g/cm³. The ellipsoidal body had a volume of about 75 cm³ with about 48 mm diameter and 62,5 mm height, axis ratio 1.30.

In a further operation the pre-pressed spherical nuclei were arranged in the center of a second rubber mold with the help of three spacers and the residual volume shape filled with graphite molding powder. The second rubber mold had an ellipsoidal cavity of 287 cm³ volume with 73 mm diameter and 105 mm height. Then there was carried out the preliminary pressing of the fuel element according to the invention at room temperature and at a pressure of 120 kp/cm². The compressed body had about 157 cm³ volume and about 80 mm height and 61 mm diameter. The body had an axis ratio of about 1.31 and a density of the graphite matrix of 1.42 g/cm³. This value of 1.42 g/cm³ corresponds to 74% of the theoretical density.

Subsequently the preliminarily pressed fuel element body was heated to 180° C. in a steel die and final pressed between two cup shaped dies to a sphere having a diameter of about 61 mm at a pressure of 120 kp/cm². The graphite matrix density under full load was about 1.91 g/cm³, corresponding to 99% of the theoretical green density.

To carbonize the resin binder the fuel element spheres were heated under argon gas in 18 hours to 840° C. and after the cooling annealed in a further operation up to 1800° C. in a vacuum (pressure $<10^{-3}$ Torr).

The finished fuel element spheres had the following properties:

Geometrical density of the graphite matrix (g/cm³): 1.74

Crushing load between two parallel steel plates (kp): 2,800

Drop strength (number of drops): 350

Anisotropic factor of the thermal expansion: 1.26

Integrity of the coated particles:
  U free/U total × 10⁶: 26
  Th free/Th total × 10⁶: 10

To determine the drop strength there was determined the number of drops from 4 meters high to the bed of spheres until there occured the first recognizable surface injury.

To determine the integrity of the coated heavy metal particles the fuel elements were decomposed electrolytically and there were ascertained fluorimetrically in the electrolyte as well as in the decomposed graphite matrix the uranium and thorium found outside the coating.

EXAMPLE 2

Up to the preliminary pressing of the fuel element in the rubber mold the steps of the procedure were the same as in Example 1. After the molding of the preliminarily pressed nucleus the rubber mold filled with the graphite molding powder was heated to 75° C. and pressed together in the steel die of the mold with the upper and lower punches at unchanged pressure of 120 kp/cm². As a result of the increased temperature at which the lubricant (stearic acid) became liquid there could be produced already in the three dimensional compressing a relatively high graphite matrix density of 1.62 g/cm³. This value corresponds to 84% of the theoretical green density. After the final pressing the fuel element spheres were heat treated as described in Example 1 and their physical properties investigated. The results of the measurements showed a clear improvement of the isotropy. The anisotropic factor of the thermal expansion was 1.19. All the remaining properties agreed well with those reported in Example 1.

We claim:

1. A process of preparing nearly isotropic spherical fuel elements of high strength and high heavy metal content for gas cooled high temperature reactors consisting essentially of a fissile and fertile fuel material containing nucleus and a fuel free shell comprising preliminary compressing a molding powder consisting essentially of (1) a mixture of natural graphite and binder resin, (2) a mixture of synthetic graphite and binder resin or (3) a mixture of both natural and synthetic graphites and binder resin together with (1) coated fissile fuel particles, (2) coated fertile fuel material particles of (3) a mixture of coated fissile fuel particles and coated fertile fuel material particles and a lubricant in a rubber mold having a cavity with the shape of an ellipsoid of revolution with elongated axis at low molding pressure three dimensionally to perform the nucleus of the fuel element, embedding the preformed nucleus in a molding powder for the shell in a second rubber mold with a cavity with the shape of an ellipsoid of revolution with elongated axis, preliminarily molding at a pressure below 200 kp/cm$^2$ three dimensionally to such an extent that the green graphite matrix of the so formed compact with the shape of an ellipsoid of revolution with elongated axis has a density of more than 65% of the theoretical density and subsequently final molding to form a sphere in a single dimension the preliminarily molded fuel element body in a steel die between semi-spherical cup shaped metal punches at a temperature within the plastic range of the binder resin at a pressure below 200 kp/cm$^2$ to a density of greater than 95% of the theoretical density of the green graphite matrix to form a sphere and then heat treating the sphere at a temperature up to 2000° C. sufficient to carbonize the resin and thereby form a spherical fuel element.

2. A process according to claim 1 wherein the preliminary molding of the shaped fuel element in the rubber mold is carried out at a temperature at which the lubricant begins to become fluid.

3. A process according to claim 1 wherein the preliminary molding of the fuel element is at 50–190 kp/cm$^2$ and the final molding is at 100–190 kp/cm$^2$.

4. A process according to claim 3 wherein the temperature is 20° to 85° C. in the preliminary molding and 100°–200° C. in the final molding.

5. A process according to claim 4 wherein the preliminary molding of the shaped fuel element in the rubber mold is carried out at a temperature at which the lubricant begins to become fluid.

6. A process according to claim 1 wherein the preliminary molding of the shaped fuel element in the second rubber mold is carried out at a temperature at which the lubricant begins to become fluid and wherein the temperature is 20° to 85° C. in the preliminary molding and 100°–200° C. in the final molding.

* * * * *